US011136975B2

(12) United States Patent
Yamaguchi et al.

(10) Patent No.: US 11,136,975 B2
(45) Date of Patent: Oct. 5, 2021

(54) DRIVE APPARATUS HAVING OIL PASSAGE DEFINED IN STOPPER BODY

(71) Applicant: Nidec Corporation, Kyoto (JP)

(72) Inventors: Yasuo Yamaguchi, Kyoto (JP); Yuki Ishikawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 261 days.

(21) Appl. No.: 16/323,633

(22) PCT Filed: Aug. 7, 2017

(86) PCT No.: PCT/JP2017/028600
§ 371 (c)(1),
(2) Date: Feb. 6, 2019

(87) PCT Pub. No.: WO2018/030345
PCT Pub. Date: Feb. 15, 2018

(65) Prior Publication Data
US 2019/0219052 A1 Jul. 18, 2019

Related U.S. Application Data

(60) Provisional application No. 62/439,201, filed on Dec. 27, 2016, provisional application No. 62/402,027, (Continued)

(30) Foreign Application Priority Data

Mar. 31, 2017 (JP) .................................. 2017-071397

(51) Int. Cl.
*F04C 2/10* (2006.01)
*F04C 15/00* (2006.01)
(Continued)

(52) U.S. Cl.
CPC ................ *F04C 2/10* (2013.01); *F04C 2/084* (2013.01); *F04C 2/102* (2013.01);
(Continued)

(58) Field of Classification Search
CPC ...... F04C 2/10; F04C 2/102; F04C 2210/206; F04C 2/084; F04C 13/002; F04C 13/005;
(Continued)

(56) References Cited

U.S. PATENT DOCUMENTS 6,039,551 A  3/2000 Takeuchi et al.
6,116,877 A  9/2000 Takeuchi et al.
(Continued)

FOREIGN PATENT DOCUMENTS

CN  102472271 A   5/2012
CN  105114302 A  12/2015
(Continued)

OTHER PUBLICATIONS

English Machine Translation of JP2003307432A, translated on Dec. 17, 2020 (Year: 2003).*

(Continued)

*Primary Examiner* — Mary Davis
*Assistant Examiner* — Paul W Thiede
(74) *Attorney, Agent, or Firm* — Keating & Bennett, LLP

(57) ABSTRACT

A pump includes an external gear, an internal gear surrounding the external gear to mesh with the external gear, a pump chamber to house the internal gear and the external gear, a suction inlet to suck an oil into the pump chamber, and a discharge outlet to discharge the oil from inside the pump chamber. The housing includes an outer cover having the pump chamber defined therein, and a first oil passage defined in the outer cover and connected to the discharge outlet. The motor shaft includes a second oil passage connected to the first oil passage, and a first through hole to (Continued)

connect the second oil passage to the motor shaft. The second oil passage opens into the first oil passage at the end portion of the motor shaft.

9 Claims, 3 Drawing Sheets

Related U.S. Application Data filed on Sep. 30, 2016, provisional application No. 62/372,411, filed on Aug. 9, 2016.

(51) Int. Cl.

| | | |
|---|---|---|
| *F04C 2/08* | (2006.01) | |
| *H02K 11/225* | (2016.01) | |
| *F16N 7/40* | (2006.01) | |
| *F04C 15/06* | (2006.01) | |
| *H02K 5/20* | (2006.01) | |
| *H02K 9/19* | (2006.01) | |
| *H02K 1/12* | (2006.01) | |
| *F04C 11/00* | (2006.01) | |
| *F04C 13/00* | (2006.01) | |
| *H02K 1/22* | (2006.01) | |
| *H02K 7/00* | (2006.01) | |
| *F16K 17/04* | (2006.01) | |
| *F16N 1/00* | (2006.01) | |
| *F16N 13/20* | (2006.01) | |
| *H02K 9/193* | (2006.01) | |

(52) U.S. Cl.
CPC ...... *F04C 15/0088* (2013.01); *F04C 15/0096* (2013.01); *F04C 15/06* (2013.01); *F16N 7/40* (2013.01); *H02K 5/20* (2013.01); *H02K 9/19* (2013.01); *H02K 11/225* (2016.01); *F04C 2/103* (2013.01); *F04C 11/008* (2013.01); *F04C 13/002* (2013.01); *F04C 13/005* (2013.01); *F04C 2210/14* (2013.01); *F04C 2210/206* (2013.01); *F04C 2240/30* (2013.01); *F16K 17/04* (2013.01); *F16N 1/00* (2013.01); *F16N 13/20* (2013.01); *F16N 2210/18* (2013.01); *F16N 2280/00* (2013.01); *H02K 1/12* (2013.01); *H02K 1/22* (2013.01); *H02K 7/003* (2013.01); *H02K 9/193* (2013.01)

(58) Field of Classification Search
CPC ...... F04C 15/06; F04C 2/103; F04C 15/0088; H02K 11/225; H02K 9/19; H02K 5/20; H02K 9/193; H02K 1/22; H02K 7/003; F16K 17/04; F16N 1/00; F16N 7/40; F16N 13/20; F16N 2210/18; F16N 2280/00
See application file for complete search history.

(56) References Cited

U.S. PATENT DOCUMENTS

| | | | |
|---|---|---|---|
| 6,227,828 B1 | 5/2001 | Takeuchi et al. | |
| 7,211,913 B2 | 5/2007 | Tsutsui et al. | |
| 7,828,095 B2 | 11/2010 | Murata et al. | |
| 9,441,628 B2 | 9/2016 | Sakata et al. | |
| 9,762,106 B2 | 9/2017 | Gauthier et al. | |
| 10,337,512 B2* | 7/2019 | Lewis | F04C 15/0007 |
| 10,916,992 B2* | 2/2021 | Yamaguchi | H02K 5/20 |
| 2004/0200350 A1 | 10/2004 | Makino et al. | |
| 2007/0178292 A1 | 8/2007 | Hasegawa et al. | |
| 2010/0183454 A1* | 7/2010 | Lubke | F04C 2/102 417/310 |
| 2012/0128513 A1 | 5/2012 | Sakata et al. | |
| 2013/0145879 A1 | 6/2013 | Nakamura et al. | |
| 2016/0153546 A1 | 6/2016 | Ogawa et al. | |
| 2017/0227006 A1* | 8/2017 | Lewis | F04C 14/265 |
| 2019/0162181 A1* | 5/2019 | Yamaguchi | H02K 9/19 |

FOREIGN PATENT DOCUMENTS

| | | | |
|---|---|---|---|
| JP | 62-29487 U | | 2/1987 |
| JP | 2003307432 A | * | 10/2003 |
| JP | 2010-004603 A | | 1/2010 |
| JP | 2010-252521 A | | 11/2010 |
| JP | 2011-004487 A | | 1/2011 |
| JP | 2011-033148 A | | 2/2011 |
| JP | 2013-055728 A | | 3/2013 |
| JP | 2016-101042 A | | 5/2016 |
| JP | 2016-181954 A | | 10/2016 |
| JP | 2017-063542 A | | 3/2017 |
| WO | 2016/033015 A1 | | 3/2016 |

OTHER PUBLICATIONS

Derwent English Abstract (Year: 2003) of JP2003307432A.*
Yamaguchi et al., "Drive Device", U.S. Appl. No. 16/323,643, filed Feb. 6, 2019.
Migita et al., "Drive Device", U.S. Appl. No. 16/323,632, filed Feb. 6, 2019.
Yamaguchi et al., "Drive Apparatus", U.S. Appl. No. 16/323,636, filed Feb. 6, 2019.
Yamaguchi, "Drive Device", U.S. Appl. No. 16/323,638, filed Feb. 6, 2019.
Yamaguchi, "Drive Device", U.S. Appl. No. 16/323,640, filed Feb. 6, 2019.
Yamaguchi, "Drive Device", U.S. Appl. No. 16/323,641, filed Feb. 6, 2019.
Official Communication issued in International Patent Application No. PCT/JP2017/028600, dated Nov. 28, 2017.

* cited by examiner

DRIVE APPARATUS HAVING OIL PASSAGE DEFINED IN STOPPER BODY

BACKGROUND OF THE INVENTION

1. Field of the Invention

The present disclosure relates to a drive apparatus.

2. Description of the Related Art

In related art, a rotary electrical machine including a case arranged to store therein a lubricating fluid to lubricate and cool a stator, a rotor, and so on is known.

A rotary electrical machine as described above sometimes includes a pump portion arranged to suck up an oil stored in a case. A rotor and a stator can be cooled by the oil being sucked up by the pump portion, and fed to the rotor and the stator, for example. In this case, it is conceivable to define an oil passage in a shaft of the rotary electrical machine, and arrange the pump portion to send the oil into the oil passage in the shaft to feed the oil from the oil passage in the shaft to the stator and so on. In this case, however, the total length of an oil passage for sending the oil up to the oil passage in the shaft may become so great that the oil cannot be sufficiently sent to the oil passage in the shaft.

SUMMARY OF THE INVENTION

A drive apparatus according to an example embodiment of the present disclosure includes a rotor including a motor shaft extending along a central axis that extends in one direction, and a rotor core fixed to the motor shaft; a stator radially opposite to the rotor with a gap therebetween; a housing including a housing portion to house the rotor and the stator, and to store an oil therein; and a pump to be driven through the motor shaft. The pump includes an external gear fixed to an end portion of the motor shaft on a first axial side, an internal gear surrounding the external gear on a radially outer side thereof to mesh with the external gear, a pump chamber to house the internal gear and the external gear, a suction inlet to suck the oil into the pump chamber, and a discharge outlet to discharge the oil from inside the pump chamber. The housing includes an outer cover to cover the motor shaft on the first axial side, and having the pump chamber defined therein, and a first oil passage defined in the outer cover and connected to the discharge outlet. The motor shaft includes a second oil passage defined in an interior of the motor shaft and connected to the first oil passage, and a first through hole to connect the second oil passage to an outer circumferential surface of the motor shaft. The first oil passage is located on the first axial side of the pump chamber. The second oil passage opens into the first oil passage at the end portion of the motor shaft on the first axial side.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A z-axis direction indicated in each figure is a vertical direction Z with a positive side and a negative side being an upper side and a lower side, respectively. In the present embodiment, the vertical direction Z corresponds to an up-down direction in each figure. In the following description, the upper side and the lower side in the vertical direction will be referred to simply as an "upper side" and a "lower side", respectively.

Figure 1:
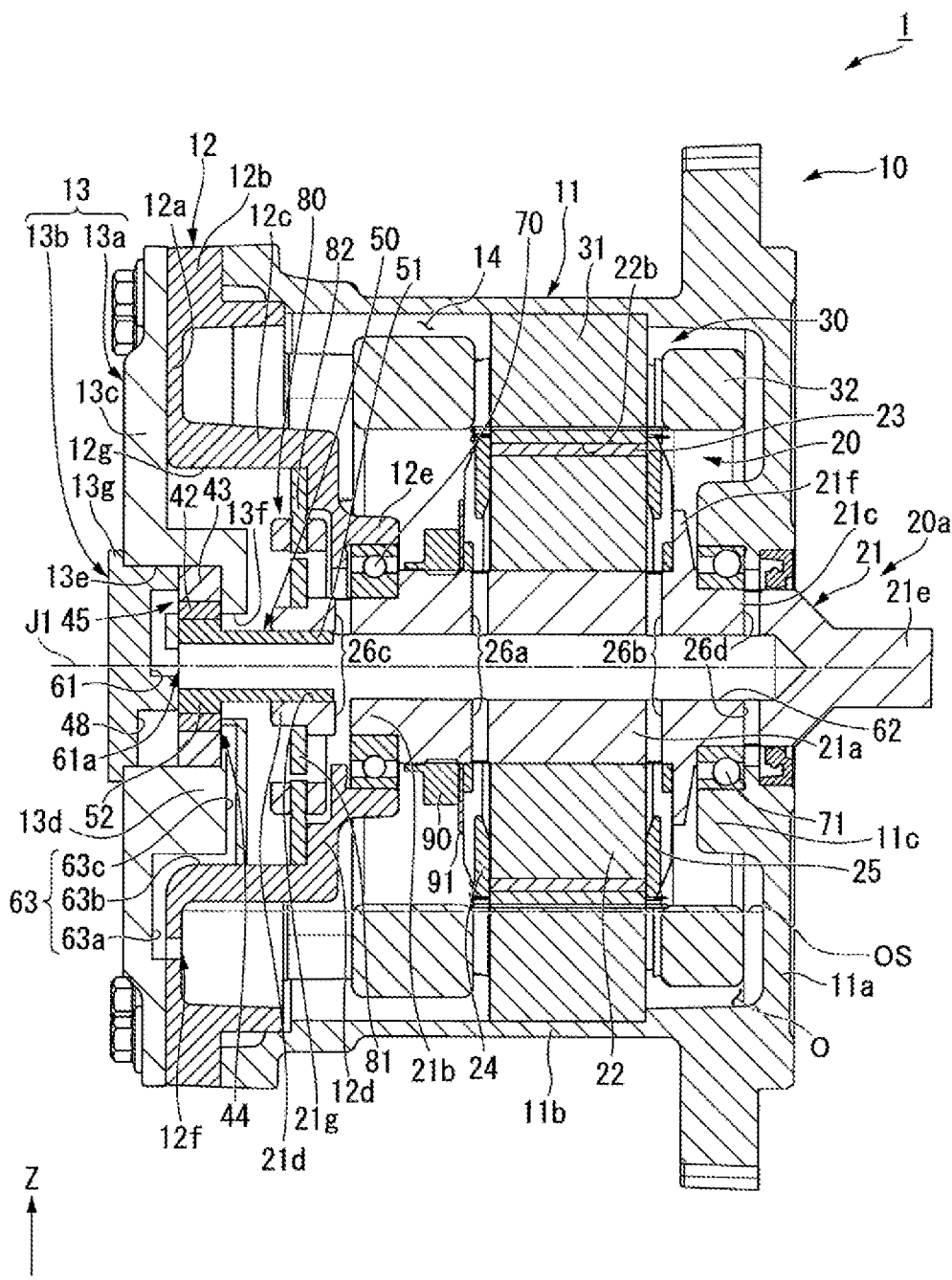
FIG. 1 is a sectional view illustrating a drive apparatus according to an example embodiment of the present disclosure.

Referring to FIG. 1, a drive apparatus 1 according to the present embodiment includes a housing 10, a rotor 20 including a motor shaft 20a arranged to extend along a central axis J1 extending in one direction, a rotation sensing portion 80, a stator 30, a pump portion 40, and bearings 70 and 71.

The central axis J1 extends in a left-right direction in FIG. 1. That is, the left-right direction in FIG. 1 corresponds to the one direction in the present embodiment. In the following description, a direction parallel to an axial direction of the central axis J1 is simply referred to by the term "axial direction", "axial", or "axially", radial directions centered on the central axis J1 are each simply referred to by the term "radial direction", "radial", or "radially", and a circumferential direction about the central axis J1 is simply referred to by the term "circumferential direction", "circumferential", or "circumferentially". In addition, a left side and a right side in the axial direction in FIG. 1 are referred to as a "first axial side" and a "second axial side", respectively.

The housing 10 includes a body portion 11, an inner cover portion 12, and an outer cover portion 13. In the present embodiment, the body portion 11, the inner cover portion 12, and the outer cover portion 13 are defined by separate members. The body portion 11 has a bottom and is tubular, and is arranged to open to the first axial side. The body portion 11 includes a bottom portion 11a, a tubular body portion 11b, and a bearing holding portion 11c. The bottom portion 11a is in the shape of an annular plate, extending radially. The tubular body portion 11b is cylindrical, and is arranged to extend to the first axial side from a radially outer edge portion of the bottom portion 11a. The bearing holding portion 11c is cylindrical, and is arranged to project to the first axial side from an inner edge portion of the bottom portion 11a. The bearing holding portion 11c is arranged to hold the bearing 71 with an inner circumferential surface thereof.

The inner cover portion 12 is attached to the body portion 11 on the first axial side. The inner cover portion 12 includes an annular plate portion 12a, an outer tubular portion 12b, an inner tubular portion 12c, an inner tube bottom portion 12d, and a bearing holding portion 12e. The annular plate portion 12a is in the shape of an annular plate, extending radially. The annular plate portion 12a is arranged to cover the stator 30 on the first axial side. That is, the inner cover portion 12 is arranged to cover the stator 30 on the first axial side. An opening portion 12f passing through the annular plate portion 12a in the axial direction is defined in a lower end portion of the annular plate portion 12a. The opening portion 12f is exposed to a housing portion 14, which will be described below.

The outer tubular portion 12b is cylindrical, and is arranged to extend to the second axial side from a radially outer edge portion of the annular plate portion 12a. An end portion of the outer tubular portion 12b on the second axial side is arranged to be in contact with and is fixed to an end portion of the tubular body portion 11b on the first axial side. The inner tubular portion 12c is cylindrical, and is arranged to extend to the second axial side from a radially inner edge portion of the annular plate portion 12a. The inner tube bottom portion 12d is annular, and is arranged to extend radially inward from an end portion of the inner tubular portion 12c on the second axial side. In the inner cover portion 12, a second recessed portion 12g, which is recessed to the second axial side from a surface of the inner cover portion 12 on the first axial side, is defined by the inner tubular portion 12c and the inner tube bottom portion 12d. That is, the inner cover portion 12 includes the second recessed portion 12g. The surface of the inner cover portion 12 on the first axial side refers to a surface of the annular plate portion 12a on the first axial side in the present embodiment. An inside surface of the second recessed portion 12g includes a radially inner surface of the inner tubular portion 12c and a surface of the inner tube bottom portion 12d on the first axial side.

The bearing holding portion 12e is cylindrical, and is arranged to project to the second axial side from a surface of the inner tube bottom portion 12d on the second axial side. The bearing holding portion 12e is arranged to hold the bearing 70 with an inner circumferential surface thereof. That is, the inner cover portion 12 is arranged to hold the bearing 70.

The housing portion 14, which is enclosed by the body portion 11 and the inner cover portion 12, is defined by the body portion 11 and the inner cover portion 12 being fixed to each other. That is, the housing 10 includes the housing portion 14. The housing portion 14 is arranged to house the rotor 20 and the stator 30, and to be capable of storing an oil O therein. The oil O is stored in a vertically lower region of the housing portion 14. It is assumed herein that the "vertically lower region of the housing portion" includes a portion of the housing portion which lies lower than a middle in the vertical direction Z.

In the present embodiment, a liquid surface OS of the oil O stored in the housing portion 14 lies higher than the opening portion 12f. The opening portion 12f is thus exposed to the oil O stored in the housing portion 14. The liquid surface OS of the oil O varies as the oil O is sucked up by the pump portion 40, but is arranged to lie lower than the rotor 20 at least when the rotor 20 is rotating. This contributes to preventing the oil O from providing resistance to rotation of the rotor 20 when the rotor 20 is rotating.

The outer cover portion 13 is attached to the inner cover portion 12 on the first axial side. The outer cover portion 13 includes an outer cover body portion 13a and a stopper body portion 13b. The outer cover body portion 13a is arranged to extend radially. The outer cover body portion 13a includes a cover plate portion 13c and a projecting portion 13d. The cover plate portion 13c is in the shape of a disk, extending radially. A radially outer edge portion of the cover plate portion 13c is fixed to the radially outer edge portion of the annular plate portion 12a. A surface of the cover plate portion 13c on the second axial side is arranged to be in contact with the surface of the annular plate portion 12a on the first axial side. The projecting portion 13d is arranged to project to the second axial side from a central portion of the cover plate portion 13c. The projecting portion 13d is inserted into the inner tubular portion 12c from the first axial side. The projecting portion 13d is arranged on the first axial side of the inner tube bottom portion 12d with a space therebetween.

The outer cover body portion 13a includes a first recessed portion 13e and a second through hole 13f. The first recessed portion 13e is recessed to the second axial side from a surface of the outer cover body portion 13a on the first axial side. The first recessed portion 13e is defined in a central portion of the outer cover body portion 13a, and is arranged to extend over both the cover plate portion 13c and the projecting portion 13d. The second through hole 13f is arranged to pass through from a bottom surface of the first recessed portion 13e to a surface of the projecting portion 13d on the second axial side. That is, the second through hole 13f is arranged to pass through from the bottom surface of the first recessed portion 13e into an interior of the housing 10. The second through hole 13f is arranged to open into an interior of the second recessed portion 12g. The second through hole 13f thus connects an interior of the first recessed portion 13e and the interior of the second recessed portion 12g. The central axis J1 passes through the second through hole 13f.

The stopper body portion 13b is fitted into the first recessed portion 13e to be fixed to the outer cover body portion 13a. The stopper body portion 13b is arranged to close an opening of the first recessed portion 13e on the first axial side. The stopper body portion 13b is arranged to cover the motor shaft 20a on the first axial side. That is, the outer cover portion 13 is arranged to cover the motor shaft 20a on the first axial side. The stopper body portion 13b includes a collar portion 13g arranged to project radially outward in an end portion thereof on the first axial side. The collar portion 13g is arranged to be in contact with a surface of the cover plate portion 13c on the first axial side. The stopper body portion 13b is thus positioned in the axial direction.

Figure 2:
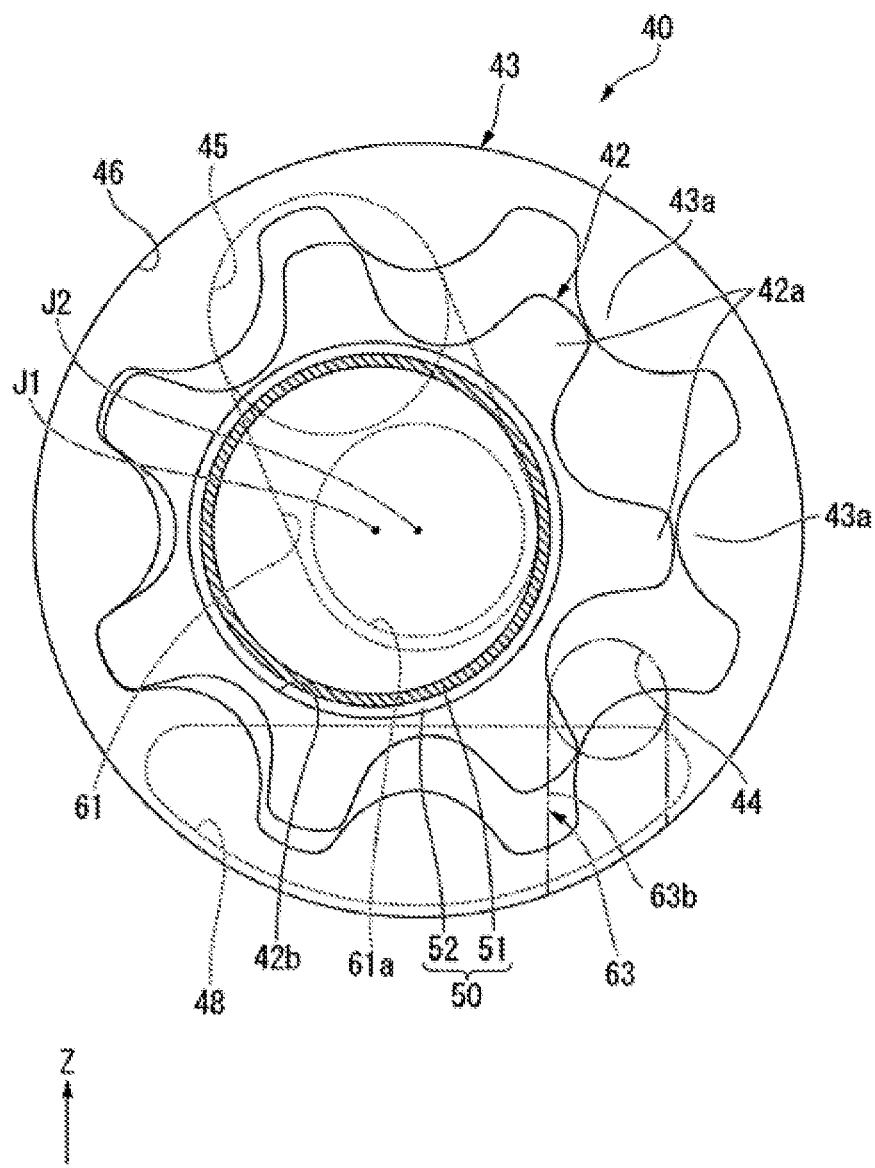
FIG. 2 is a diagram illustrating a pump portion according to an example embodiment of the present disclosure when viewed from a second axial side.

The outer cover portion 13 has a pump chamber 46 defined therein. The pump chamber 46 is defined axially between a surface of the stopper body portion 13b on the second axial side and the bottom surface of the first recessed portion 13e. In the present embodiment, a surface of the pump chamber 46 on the second axial side corresponds to the bottom surface of the first recessed portion 13e. A surface of the pump chamber 46 on the first axial side corresponds to the surface of the stopper body portion 13b on the second axial side. The pump chamber 46 is an end portion of the interior of the first recessed portion 13e on the second axial side. The pump chamber 46 is arranged radially inside of the inner tubular portion 12c, that is, in the interior of the second recessed portion 12g. The central axis J1 passes through the pump chamber 46. Referring to FIG. 2, the pump chamber 46 is arranged to have a circular external shape when viewed in the axial direction. The pump chamber 46 is arranged to house an internal gear 43 and an external gear 42, which will be described below.

Referring to FIG. 1, the housing 10 includes a first oil passage 61 and a third oil passage 63. The first oil passage 61 is defined in the outer cover portion 13. In more detail, the first oil passage 61 is defined in the stopper body portion 13b. Accordingly, the structure of the first oil passage 61 can be easily changed by changing the stopper body portion 13b. The first oil passage 61 is arranged on the first axial side of the pump chamber 46. The first oil passage 61 is arranged to connect an upper end portion of the pump chamber 46 and a central portion of the pump chamber 46 on the first axial side of the pump chamber 46. Portions of the first oil passage 61 which are connected to the pump chamber 46 are arranged to open in the surface of the stopper body portion 13b on the second axial side.

The upper end portion of the pump chamber 46 connected to the first oil passage 61 is a discharge outlet 45. That is, the first oil passage 61 is connected to the discharge outlet 45. The central portion of the pump chamber 46 connected to the first oil passage 61 is a connection opening 61a. Referring to FIG. 2, each of the discharge outlet 45 and the connection opening 61a is, for example, circular. The discharge outlet 45 is arranged higher than the connection opening 61a. The central axis J1 passes through the connection opening 61a.

Referring to FIG. 1, the third oil passage 63 is arranged to extend upward from the opening portion 12f. The third oil passage 63 is connected to the vertically lower region of the housing portion 14 through the opening portion 12f. An upper end portion of the third oil passage 63 is connected to the pump chamber 46 on the second axial side of the pump chamber 46. A portion of the pump chamber 46 to which the third oil passage 63 is connected is a suction inlet 44. That is, the third oil passage 63 is arranged to connect the suction inlet 44 and the vertically lower region of the housing portion 14. Referring to FIG. 2, the suction inlet 44 is, for example, circular. The suction inlet 44 is arranged lower than each of the discharge outlet 45 and the connection opening 61a. The suction inlet 44 is arranged lower than the central axis J1.

Referring to FIG. 1, the third oil passage 63 includes a first portion 63a, a second portion 63b, and a third portion 63c. The first portion 63a is arranged to extend upward from the opening portion 12f. An upper end portion of the first portion 63a is arranged higher than an inner peripheral surface of a lower end portion of the inner tubular portion 12c. The first portion 63a is defined, for example, by a groove extending in the vertical direction Z and recessed to the first axial side from the surface of the cover plate portion 13c on the second axial side being closed by the surface of the annular plate portion 12a on the first axial side. Thus, the first portion 63a is arranged axially between the inner cover portion 12 and the outer cover portion 13.

The second portion 63b is arranged to extend to the second axial side from the upper end portion of the first portion 63a. The second portion 63b is defined by a groove recessed upward from a lower surface of the projecting portion 13d and extending to the second axial side being closed by an inner circumferential surface of the inner tubular portion 12c. Thus, the second portion 63b is arranged radially between the inner cover portion 12 and the outer cover portion 13.

The third portion 63c is arranged to extend upward from an end portion of the second portion 63b on the second axial side. The third portion 63c is defined in the projecting portion 13d. The third portion 63c is arranged radially inside of the inner tubular portion 12c. The third portion 63c is connected to the suction inlet 44. In the present embodiment, at least a portion of the third oil passage 63 is arranged axially between the inner cover portion 12 and the outer cover portion 13. Thus, at least a portion of the third oil passage 63 can be defined by the inner cover portion 12 and the outer cover portion 13 fixed to each other, which makes it easy to make the third oil passage 63.

The rotor 20 includes the motor shaft 20a, a rotor core 22, magnets 23, a first end plate 24, and a second end plate 25. The motor shaft 20a includes a motor shaft body 21 and an attachment member 50. The motor shaft body 21 is columnar, extending in the axial direction. The motor shaft body 21 includes a large diameter portion 21a, a first medium diameter portion 21b, a second medium diameter portion 21c, a small diameter portion 21d, and an output portion 21e.

The large diameter portion 21a is a portion to which the rotor core 22 is attached. An outer circumferential surface of an end portion of the large diameter portion 21a on the first axial side includes a male screw portion defined therein. A nut 90 is screwed onto the male screw portion of the large diameter portion 21a. The first medium diameter portion 21b is continuous with the large diameter portion 21a on the first axial side of the large diameter portion 21a. The first medium diameter portion 21b is arranged to have an outside diameter smaller than an outside diameter of the large diameter portion 21a. An end portion of the first medium diameter portion 21b on the second axial side is rotatably supported by the bearing 70.

The second medium diameter portion 21c is continuous with the large diameter portion 21a on the second axial side of the large diameter portion 21a. The second medium diameter portion 21c is arranged to have an outside diameter smaller than the outside diameter of the large diameter portion 21a. An end portion of the second medium diameter portion 21c on the first axial side is rotatably supported by the bearing 71. The bearings 70 and 71 are arranged to rotatably support the motor shaft 20a. Each of the bearings 70 and 71 is, for example, a ball bearing.

The small diameter portion 21d is continuous with the first medium diameter portion 21b on the first axial side of the first medium diameter portion 21b. An end portion of the small diameter portion 21d on the first axial side corresponds to an end portion of the motor shaft body 21 on the first axial side. The end portion of the small diameter portion 21d on the first axial side is arranged radially inside of the inner tubular portion 12c. The small diameter portion 21d is arranged to have an outside diameter smaller than the outside diameter of the first medium diameter portion 21b. That is, the small diameter portion 21d is a portion having a decreased outside diameter on the first axial side.

The output portion 21e is continuous with the second medium diameter portion 21c on the second axial side of the second medium diameter portion 21c. The output portion 21e corresponds to an end portion of the motor shaft body 21 on the second axial side. The output portion 21e is arranged to have an outside diameter smaller than the outside diameter of the small diameter portion 21d. The output portion 21e is arranged to project outwardly of the housing 10 passing through the bottom portion 11a in the axial direction.

The motor shaft body 21 includes a flange portion 21f. The flange portion 21f is arranged to project radially outward from an outer circumferential surface of the large diameter portion 21a. The flange portion 21f is in the shape of an annular plate, extending all the way around the outer circumferential surface of the large diameter portion 21a. The flange portion 21f is arranged at an end portion of the large diameter portion 21a on the second axial side. The motor shaft body 21 includes a hole portion 21g arranged to extend to the second axial side from the end portion of the motor shaft body 21 on the first axial side. The hole portion 21g is a hole having a closed bottom and opening to the first axial side. That is, an end portion of the hole portion 21g on the second axial side is closed.

The attachment member 50 is fixed to the motor shaft body 21 on the first axial side. The attachment member 50 is fitted into the hole portion 21g to be fixed. The attachment member 50 is tubular, and is arranged to open to both axial sides. In the present embodiment, the attachment member 50 is cylindrical and is centered on the central axis J1. The attachment member 50 is arranged to extend farther to the first axial side than the motor shaft body 21 to pass through the second through hole 13f.

The attachment member 50 includes a fitting portion 51 and a fixing portion 52. The fitting portion 51 is a portion fitted into the hole portion 21g. The fitting portion 51 is fixed to an inner circumferential surface of an end portion of the hole portion 21g on the first axial side, and is arranged to extend from inside the hole portion 21g farther to the first axial side than the motor shaft body 21. An end portion of the fitting portion 51 on the first axial side is inserted in the second through hole 13f. That is, at least a portion of the fitting portion 51 is inserted in the second through hole 13f. Thus, a large radial gap can be defined between an outer circumferential surface of the attachment member 50 and an inner circumferential surface of the second through hole 13f. This contributes to preventing the attachment member 50 from coming into contact with the inner circumferential surface of the second through hole 13f even if a radial displacement of the attachment member 50 is caused by a vibration or the like.

The fixing portion 52 is arranged on the first axial side of the fitting portion 51. The fixing portion 52 is continuous with the end portion of the fitting portion 51 on the first axial side. The fixing portion 52 is arranged to have an outside diameter greater than an outside diameter of the fitting portion 51 and smaller than a diameter of the second through hole 13f. The fixing portion 52 is inserted into the pump chamber 46. The inside diameter of the fitting portion 51 and the inside diameter of the fixing portion 52 are arranged to be the same, for example.

The external gear 42, which will be described below, is fixed to the attachment member 50. In the present embodiment, the external gear 42 is fixed to a radially outer surface of the fixing portion 52. In more detail, the fixing portion 52 is fitted into and fixed in a fixing hole portion 42b passing through the external gear 42 in the axial direction. As described above, in the present embodiment, the fitting portion 51, which has an outside diameter smaller than that of the fixing portion 52, is fitted into the hole portion 21g, while the fixing portion 52, which has an outside diameter greater than that of the fitting portion 51, is fixed to the external gear 42. This allows the hole portion 21g to have a diameter smaller than a diameter of the fixing hole portion 42b of the external gear 42. This makes it easy for the hole portion 21g to have a relatively small diameter, which contributes to minimizing a reduction in rigidity of the motor shaft body 21.

The motor shaft 20a includes a second oil passage 62 defined in an interior of the motor shaft 20a. The second oil passage 62 is a hole portion having a closed bottom and arranged to be recessed and extend to the second axial side from an end portion of the motor shaft 20a on the first axial side. The second oil passage 62 is arranged to open to the first axial side. The second oil passage 62 is arranged to extend from an end portion of the attachment member 50 on the first axial side to an end portion of the second medium diameter portion 21c on the second axial side so as to extend over both the attachment member 50 and the motor shaft body 21. The second oil passage 62 is defined by an interior of the attachment member 50 and the hole portion 21g being connected to each other in the axial direction. That is, a radially inner surface of the attachment member 50 defines a portion of a radially inner surface of the second oil passage 62.

In the present embodiment, an inner edge of the second oil passage 62 is circular with the central axis J1 in a center in a cross-section perpendicular to the axial direction. The diameter of a portion of the second oil passage 62 which is defined in the attachment member 50 is smaller than the diameter of a portion of the second oil passage 62 which is defined in the motor shaft body 21. That is, the inside diameter of the attachment member 50 is smaller than the diameter of the hole portion 21g. An opening of the attachment member 50 on the first axial side is connected to the connection opening 61a, so that the second oil passage 62 is connected to the first oil passage 61 through the interior of the attachment member 50. That is, the second oil passage 62 is arranged to open into the first oil passage 61 at the end portion of the motor shaft 20a on the first axial side.

Figure 3:
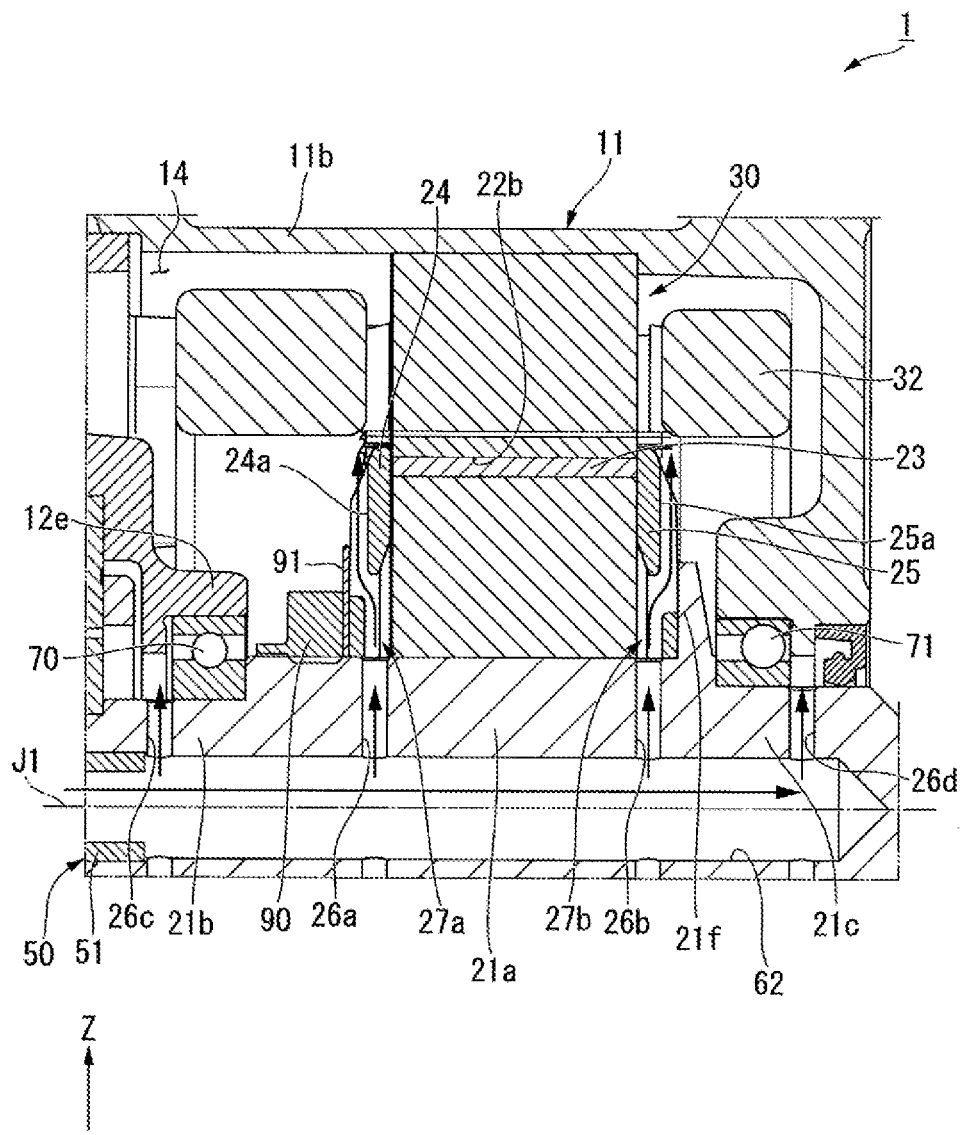
FIG. 3 is a sectional view illustrating a portion of a drive apparatus according to an example embodiment of the present disclosure.

The motor shaft 20a includes first through holes 26a, 26b, 26c, and 26d each of which is arranged to connect the second oil passage 62 to an outer circumferential surface of the motor shaft 20a. Each of the first through holes 26a to 26d is arranged to extend in a radial direction. Each of the first through holes 26a and 26b is defined in the large diameter portion 21a. Each of the first through holes 26a and 26b is arranged axially between the nut 90 and the flange portion 21f. Referring to FIG. 3, a radially outer end portion of each first through hole 26a is arranged to open into an axial gap 27a between the first end plate 24 and the rotor core 22. A radially outer end portion of each first through hole 26b is arranged to open into an axial gap 27b between the second end plate 25 and the rotor core 22.

Each first through hole 26c is defined in the first medium diameter portion 21b. A radially outer end portion of the first through hole 26c is arranged to open into a gap radially inside of the bearing holding portion 12e on the first axial side of the bearing 70. Each first through hole 26d is defined in the second medium diameter portion 21c. A radially outer end portion of the first through hole 26d is arranged to open into a gap radially inside of the bearing holding portion 11c on the second axial side of the bearing 71. The first through holes 26a, 26b, 26c, and 26d are each more than one in number, and are each arranged along a circumferential direction, for example.

Referring to FIG. 1, the rotor core 22 is annular, and is fixed to the motor shaft body 21. In the present embodiment, the rotor core 22 is fitted to the large diameter portion 21a. The rotor core 22 includes a plurality of magnet insert holes 22b each of which is arranged to pass through the rotor core 22 in the axial direction. The plurality of magnet insert holes 22b are arranged along the circumferential direction. The magnets 23 are inserted into the magnet insert holes 22b.

Each of the first end plate 24 and the second end plate 25 is in the shape of an annular plate, extending radially. The large diameter portion 21a is arranged to pass through each of the first end plate 24 and the second end plate 25. The rotor core 22 is held axially between the first end plate 24 and the second end plate 25, with each of the first end plate 24 and the second end plate 25 being in contact with the rotor core 22.

Referring to FIG. 3, the first end plate 24 is arranged on the first axial side of the rotor core 22. A radially outer edge portion of the first end plate 24 is arranged to project to the second axial side to be in contact with a radially outer edge portion of a surface of the rotor core 22 on the first axial side. The radially outer edge portion of the first end plate 24 is arranged to axially overlap with an opening portion of each magnet insert hole 22b on the first axial side to hold the magnet 23 inserted in each magnet insert hole 22b from the first axial side. A portion of the first end plate 24 which lies radially inward of the radially outer edge portion thereof is arranged axially opposite to the surface of the rotor core 22 on the first axial side with the gap 27a therebetween.

The first end plate 24 includes an emitting groove 24a recessed to the second axial side from a surface of the first end plate 24 on the first axial side. The emitting groove 24a is arranged to extend in a radial direction. A radially inner end portion of the emitting groove 24a is arranged to pass through the first end plate 24 in the axial direction to be connected to the gap 27a. A radially outer end portion of the emitting groove 24a is arranged to open radially outwardly of the first end plate 24, and is arranged to be radially opposed to coils 32, which will be described below, with a gap therebetween. An opening of a radially inner portion of the emitting groove 24a on the first axial side is closed by a washer 91, which is fixed by being held axially between the nut 90 and the first end plate 24. The washer 91 is in the shape of an annular plate, extending radially.

The second end plate 25 is arranged on the second axial side of the rotor core 22. A radially outer edge portion of the second end plate 25 is arranged to project to the first axial side to be in contact with a radially outer edge portion of a surface of the rotor core 22 on the second axial side. The radially outer edge portion of the second end plate 25 is arranged to axially overlap with an opening portion of each magnet insert hole 22b on the second axial side to hold the magnet 23 inserted in each magnet insert hole 22b from the second axial side. Thus, the magnet 23 inserted in each magnet insert hole 22b is held on both axial sides by the first end plate 24 and the second end plate 25. This contributes to preventing each magnet 23 from coming out of the corresponding magnet insert hole 22b.

A portion of the second end plate 25 which lies radially inward of the radially outer edge portion thereof is arranged axially opposite to the surface of the rotor core 22 on the second axial side with the gap 27b therebetween. The second end plate 25 includes an emitting groove 25a recessed to the first axial side from a surface of the second end plate 25 on the second axial side. The emitting groove 25a is arranged to extend in a radial direction. A radially inner end portion of the emitting groove 25a is arranged to pass through the second end plate 25 in the axial direction to be connected to the gap 27b. A radially outer end portion of the emitting groove 25a is arranged to open radially outwardly of the second end plate 25, and is arranged to be radially opposed to the coils 32, which will be described below, with a gap therebetween. An opening of a radially inner portion of the emitting groove 25a on the second axial side is closed by the flange portion 21f.

The first end plate 24, the rotor core 22, and the second end plate 25 are held axially between a combination of the nut 90 and the washer 91 and the flange portion 21f. The nut 90 is screwed onto the male screw portion of the large diameter portion 21a, so that the nut 90 presses the first end plate 24, the rotor core 22, and the second end plate 25 against the flange portion 21f with the washer 91 intervening between the nut 90 and the first end plate 24. Thus, each of the first end plate 24, the rotor core 22, and the second end plate 25 is fixed to the motor shaft 20a.

The rotation sensing portion 80 illustrated in FIG. 1 is arranged to sense the rotation of the rotor 20. In the present embodiment, the rotation sensing portion 80 is, for example, a variable reluctance (VR) resolver. The rotation sensing portion 80 is arranged radially inside of the inner tubular portion 12c. The rotation sensing portion 80 includes a sensed portion 81 and a sensor portion 82.

The sensed portion 81 is annular, extending in the circumferential direction. The sensed portion 81 is fitted and fixed to the motor shaft 20a. In more detail, the sensed portion is fitted and fixed to the small diameter portion 21d. A surface of a radially inner edge portion of the sensed portion 81 on the second axial side is arranged to be in contact with a shoulder at a boundary between the first medium diameter portion 21b and the small diameter portion 21d. The sensed portion 81 is arranged to radially overlap with the attachment member 50. This arrangement makes it easier to reduce the axial dimension of the motor shaft 20a than in the case where the sensed portion 81 and the attachment member 50 are arranged axially apart from each other without radially overlapping with each other. The sensed portion 81 is made of a magnetic material.

Note that, when objects are herein described as "overlapping with each other in a given direction", it may mean that the objects overlap with each other when viewed along the given direction. That is, when the sensed portion 81 and the attachment member 50 are described as radially overlapping with each other, it may mean that the sensed portion 81 and the attachment member 50 overlap with each other when viewed along a radial direction.

The sensor portion 82 is arranged axially between the inner cover portion 12 and the outer cover portion 13. In more detail, the sensor portion 82 is fixed to the surface of the inner tube bottom portion 12d on the first axial side on a radially inner side of the inner tubular portion 12c. That is, the sensor portion 82 is attached to the inner cover portion 12. Thus, attachment of the sensor portion 82 can be easily accomplished. The sensor portion 82 is arranged in the second recessed portion 12g. Therefore, it is possible to insert the sensor portion 82 into the second recessed portion 12g through an opening of the second recessed portion 12g on the first axial side to arrange the sensor portion 82 therein after the inner cover portion 12 is attached to the body portion 11. Thus, the arrangement of the sensor portion 82 can be easily accomplished.

The sensor portion 82 is annular, surrounding the sensed portion 81 on a radially outer side thereof. The sensor portion 82 includes a plurality of coils arranged along the circumferential direction. As a result of the sensed portion 81 rotating together with the motor shaft 20a, an induced voltage is generated in the coils of the sensor portion 82 in accordance with the circumferential position of the sensed portion 81. The sensor portion 82 senses the rotation of the sensed portion 81 by sensing the induced voltage. Thus, the rotation sensing portion 80 senses the rotation of the rotor 20 by sensing the rotation of the motor shaft 20a.

The stator 30 is arranged radially opposite to the rotor 20 with a gap therebetween. The stator 30 includes a stator core 31 and the coils 32 attached to the stator core 31. The stator core 31 is annular, and is centered on the central axis J1. An outer circumferential surface of the stator core 31 is fixed to an inner circumferential surface of the tubular body portion 11b. The stator core 31 is arranged radially outside of and opposite to the rotor core 22 with a gap therebetween.

The pump portion 40 is arranged in a central portion of the outer cover portion 13. The pump portion 40 is arranged on the first axial side of the motor shaft 20a. The pump portion 40 includes the external gear 42, the internal gear 43, the aforementioned pump chamber 46, the suction inlet 44, the discharge outlet 45, and a storage portion 48. The external gear 42 is a gear arranged to be capable of rotating about the central axis J1. The external gear 42 is fixed to the end portion of the motor shaft 20a on the first axial side. In more detail, the external gear 42 is fixed to an outer circumferential surface of the fixing portion 52. Accordingly, the external gear 42 can be fixed to the motor shaft body 21 with the attachment member 50 intervening therebetween. Thus, the external gear 42 can be fixed to the motor shaft body 21 by adjusting the dimensions of the attachment member 50 without changing the dimensions of the motor shaft body 21 or the dimensions of the external gear 42.

The external gear 42 is housed in the pump chamber 46. Referring to FIG. 2, the external gear 42 includes a plurality of tooth portions 42a in an outer circumferential surface thereof. The tooth portions 42a of the external gear 42 are arranged to have a trochoid tooth profile.

The internal gear 43 is an annular gear arranged to be capable of rotating about a rotation axis J2 eccentric with respect to the central axis J1. The internal gear 43 is housed in the pump chamber 46. The internal gear 43 is arranged to surround the external gear 42 on the radially outer side thereof, and is arranged to mesh with the external gear 42. The internal gear 43 includes a plurality of tooth portions 43a in an inner circumferential surface thereof. The tooth portions 43a of the internal gear 43 are arranged to have a trochoid tooth profile. Thus, a trochoid pump can be defined because of the trochoid tooth profile of the tooth portions 42a of the external gear 42 and the trochoid tooth profile of the tooth portions 43a of the internal gear 43. This leads to a reduction in noise generated from the pump portion 40, and makes it easier to stabilize the pressure and amount of the oil O discharged from the pump portion 40.

In the present embodiment, the internal gear 43 and the external gear 42 are inserted into the first recessed portion 13e through the opening of the first recessed portion 13e on the first axial side, and then, the opening of the first recessed portion 13e on the first axial side is closed by the stopper body portion 13b, whereby the pump chamber 46 is defined, and the internal gear 43 and the external gear 42 are housed in the pump chamber 46. The pump portion 40 can thus be easily assembled.

As described above, the suction inlet 44 is connected to the third oil passage 63. As illustrated in FIG. 1, the suction inlet 44 is arranged to open to the second axial side in the pump chamber 46. The suction inlet 44 is connected to a gap between the external gear 42 and the internal gear 43. The suction inlet 44 is arranged to be capable of sucking the oil O stored in the housing portion 14 into the pump chamber 46, more specifically into the gap between the external gear 42 and the internal gear 43, through the opening portion 12f and the third oil passage 63. Referring to FIG. 2, the suction inlet 44 is arranged higher than a lower end portion of the storage portion 48 and higher than a lower end portion of the external gear 42.

As described above, the discharge outlet 45 is connected to the first oil passage 61. Referring to FIG. 1, the discharge outlet 45 is arranged to open to the first axial side in the pump chamber 46. The discharge outlet 45 is connected to the gap between the external gear 42 and the internal gear 43. The discharge outlet 45 is arranged to be capable of discharging the oil O from inside the pump chamber 46, more specifically from inside the gap between the external gear 42 and the internal gear 43.

The storage portion 48 is connected to the pump chamber 46 on the first axial side of a vertically lower region of the pump chamber 46. Referring to FIG. 2, the storage portion 48 is in the shape of a bow being convex downward when viewed in the axial direction. A portion of the oil O sucked into the pump chamber 46 through the suction inlet 44 flows into the storage portion 48.

Since the suction inlet 44 is arranged higher than the lower end portion of the storage portion 48, at least a portion of the oil O which has flowed into the storage portion 48 is stored in the storage portion 48 without returning into the housing portion 14 through the suction inlet 44 even when the pump portion 40 is at rest. Thus, a lower portion of the external gear 42 and a lower portion of the internal gear 43 in the pump chamber 46 can stay in contact with the oil O in the storage portion 48 while the pump portion 40 is at rest. Accordingly, when the pump portion 40 is driven again, the oil O can be caused to intervene between the tooth portions 42a of the external gear 42 and the tooth portions 43a of the internal gear 43 and between an inner circumferential surface of the pump chamber 46 and an outer circumferential surface of the internal gear 43 to prevent a seizure.

Once the motor shaft 20a rotates along with the rotation of the rotor 20, the external gear 42, which is fixed to the motor shaft 20a, rotates. As a result, the internal gear 43, which meshes with the external gear 42, rotates to cause the oil O sucked into the pump chamber 46 through the suction inlet 44 to be sent to the discharge outlet 45 through the gap between the external gear 42 and the internal gear 43. The pump portion 40 is arranged to be driven through the motor shaft 20a in the above-described manner. After being discharged through the discharge outlet 45, the oil O flows into the first oil passage 61, and flows into the second oil passage 62 through the connection opening 61a. As indicated by an arrow in FIG. 3, after flowing into the second oil passage 62, the oil O receives a radially outward force due to a centrifugal force of the rotating motor shaft 20a, and flows out of the motor shaft 20a through the first through holes 26a to 26d.

In the present embodiment, each first through hole 26a is arranged to open into the axial gap 27a between the first end plate 24 and the rotor core 22, and therefore, a portion of the oil O which has flowed out through the first through hole 26a flows into the gap 27a. After flowing into the gap 27a, the oil O is emitted radially outward through the emitting groove 24a. In the present embodiment, the opening of the radially inner portion of the emitting groove 24a on the first axial side is closed by the washer 91, and thus, a portion of the oil O which has flowed into the emitting groove 24a is easily guided radially outward by the washer 91.

Each first through hole 26b is arranged to open into the axial gap 27b between the second end plate 25 and the rotor core 22, and therefore, a portion of the oil O which has flowed out through the first through hole 26b flows into the gap 27b. After flowing into the gap 27b, the oil O is emitted radially outward through the emitting groove 25a. In the present embodiment, the opening of the radially inner portion of the emitting groove 25a on the second axial side is closed by the flange portion 21f, and thus, a portion of the oil O which has flowed into the emitting groove 25a is easily guided radially outward by the flange portion 21f.

A portion of the oil O which has been emitted radially outward through each of the emitting grooves 24a and 25a is blown onto the coils 32. Thus, the coils 32 can be cooled by the oil O. In the present embodiment, the second oil passage 62 is defined in the interior of the motor shaft 20a, and therefore, the oil O is able to cool the rotor 20 before being emitted through each of the emitting grooves 24a and 25a. In the present embodiment, the oil O, which is discharged through the discharge outlet 45, is led to the rotor 20 and the stator 30 in the above-described manner.

Since each first through hole 26c is arranged to open into the gap radially inside of the bearing holding portion 12e, a portion of the oil O which has flowed out through the first through hole 26c is fed to the bearing 70. Since each first through hole 26d is arranged to open into the gap radially inside of the bearing holding portion 11c, a portion of the oil O which has flowed out through the first through hole 26d is fed to the bearing 71. Thus, the oil O can be used as a lubricant for the bearings 70 and 71.

Note that, although FIG. 3 illustrates an example in which the oil O is emitted upward through each of the emitting grooves 24a and 25a, the present invention is not limited to this. Because the rotor 20 rotates, the circumferential position of each of the emitting grooves 24a and 25a varies in accordance with the rotation of the rotor 20. Accordingly, the direction in which the oil O is emitted through each of the emitting grooves 24a and 25a varies along the circumferential direction, so that the coils 32 arranged along the circumferential direction can be cooled by the oil O.

As described above, the pump portion 40 can be driven by the rotation of the motor shaft 20a, and the oil O stored in the housing 10 can be sucked up by the pump portion 40 to be fed to the rotor 20, the stator 30, and the bearings 70 and 71. Thus, the oil O stored in the housing 10 can be used to cool the rotor 20 and the stator 30, and to improve lubricity between the motor shaft body 21 and each of the bearings 70 and 71. The oil O fed to each of the stator 30 and the bearings 70 and 71 falls in the housing portion 14, and is stored in the lower region of the housing portion 14 again. Circulation of the oil O in the housing portion 14 can thus be achieved.

According to the present embodiment, provision of the first oil passage 61 and the second oil passage 62 enables the oil O discharged through the discharge outlet 45 to be sent to the interior of the motor shaft 20a. In addition, provision of the first through holes 26a to 26d enables the oil O which has flowed into the second oil passage 62 to be fed to each of the stator 30 and the bearings 70 and 71.

In addition, in the present embodiment, the second oil passage 62 defined in the motor shaft 20a is arranged to open into the first oil passage 61, which is connected to the discharge outlet 45, at the end portion of the motor shaft 20a on the first axial side. Since the external gear 42 is fixed to the end portion of the motor shaft 20a on the first axial side, the end portion of the motor shaft 20a on the first axial side is arranged relatively close to the discharge outlet 45. This leads to a reduced length of the first oil passage 61, which is arranged to connect the discharge outlet 45 and the second oil passage 62. Thus, according to the present embodiment, a reduction in the length of an oil passage from the opening portion 12f to the second oil passage 62 can be easily achieved. This makes it easier to send the oil O to the second oil passage 62, which is defined in the interior of the motor shaft 20a. In addition, the structure of the drive apparatus 1 can be easily simplified to make it easier to manufacture the drive apparatus 1.

In addition, according to the present embodiment, the radially inner surface of the attachment member 50 defines a portion of the radially inner surface of the second oil passage 62. This allows the oil O to flow into the second oil passage 62 through the attachment member 50 with the external gear 42 being fixed to the attachment member 50. Thus, as described above, the motor shaft body 21 and the external gear 42 can be fixed to each other with the attachment member 50 intervening therebetween without changing the dimensions of the motor shaft body 21 or the dimensions of the external gear 42, and the second oil passage 62 can be easily caused to open into the first oil passage 61.

The present invention is not limited to the above-described embodiment, and other structures may be adopted in other embodiments of the present invention. The external gear 42 may alternatively be directly fixed to the motor shaft body 21 without the attachment member 50 intervening therebetween. In this case, the second oil passage 62 may be defined only in an interior of the motor shaft body 21, for example. Also note that the attachment member 50 may alternatively be fixed to an outer circumferential surface of the motor shaft body 21.

Also note that the attachment member 50 may alternatively be a member that has a uniform outside diameter throughout its axial extent. In other words, the fitting portion 51 and the fixing portion 52 may alternatively be arranged to have the same outside diameter. In this case, the outside diameter of the fixing portion 52 may be reduced to the outside diameter of the fitting portion 51 illustrated in FIG. 1, for example, and this will make it possible to reduce the outside diameter of the external gear 42, to which the fixing portion 52 is fixed. This, in turn, will make it possible to reduce the outside diameter of the internal gear 43, resulting in a reduced inside diameter of the pump chamber 46. This, in turn, will make it possible to reduce the outside diameter of the projecting portion 13d, in which the pump chamber 46 is defined, to enlarge a radial space between a radially outer surface of the projecting portion 13d and an inner circumferential surface of the second recessed portion 12g. As a result, a portion of the sensor portion 82 which projects to the first axial side, for example, can be arranged in the radial space between the radially outer surface of the projecting portion 13d and the inner circumferential surface of the second recessed portion 12g, and the sensor portion 82 can be arranged closer to the outer cover portion 13. This will make it easier to reduce the axial dimension of the drive apparatus 1 as a whole. Note that the portion of the sensor portion 82 which projects to the first axial side may be, for example, the coils of the sensor portion 82.

Also note that the attachment member 50 may alternatively be defined by two or more separate members. In this case, the attachment member 50 may include a first tubular member to be fitted into the hole portion 21g, and a second tubular member to be fitted to the first tubular member and arranged to extend farther to the first axial side than the motor shaft body 21. In this case, the external gear 42 is fixed to an end portion of the second tubular member on the first axial side.

In addition, in the above-described embodiment, the portion of the attachment member 50 which is arranged to pass through the second through hole 13f is the fitting portion 51, which is arranged to have an outside diameter smaller than that of the fixing portion 52. Accordingly, the second through hole 13f may alternatively be arranged to have a diameter smaller than the outside diameter of the fixing portion 52 to make the radial gap between the outer circumferential surface of the attachment member 50 and the inner circumferential surface of the second through hole 13f relatively small. This contributes to preventing the oil O in the pump chamber 46 from leaking through the second through hole 13f. In the case where this structure is adopted, an assembler attaches the outer cover portion 13 to the inner cover portion 12, and thereafter inserts the fitting portion 51 into the second through hole 13f through the opening of the first recessed portion 13e on the left side, and fits the fitting portion 51 into the hole portion 21g of the motor shaft body 21, so that the attachment member 50 is fixed to the motor shaft body 21.

In addition, a reduced size of the second through hole 13*f* will make it possible to arrange a radially inner end portion of a closing portion that closes an opening of the pump chamber 46 on the second axial side more radially inward. The closing portion that closes the opening of the pump chamber 46 on the second axial side corresponds to a portion of the projecting portion 13*d* which lies radially outside of the second through hole 13*f* in the present embodiment. When the radially inner end portion of the closing portion can be arranged more radially inward, the opening of the pump chamber 46 on the second axial side can be properly closed by the closing portion even if each of the outside diameter of the external gear 42 and the outside diameter of the internal gear 43 is reduced. Therefore, the inside diameter of the pump chamber 46 can be reduced. Accordingly, as described above, a portion of the sensor portion 82 can be arranged in the radial space between the radially outer surface of the projecting portion 13*d* and the inner circumferential surface of the second recessed portion 12*g*, and this makes it easier to reduce the axial dimension of the drive apparatus 1.

The rotor core 22 may be fixed to the outer circumferential surface of the motor shaft body 21 through, for example, press fitting. In this case, the first end plate 24 and the second end plate 25 may be omitted. In addition, in this case, a portion of the oil O which has flowed out through each of the first through holes 26*a* and 26*b* may be directly fed to the coils 32, or alternatively, holes connected to the first through holes 26*a* may be defined in the rotor core 22, and the oil O may be fed to the coils 32 through the holes of the rotor core 22. Also note that the oil O may be fed to the stator core 31.

Also note that the oil O discharged through the discharge outlet 45 may be fed to any desired place, and may be fed to, for example, only one or two of the rotor 20, the stator 30, and the bearings 70 and 71, or to none of the above. The oil O discharged through the discharge outlet 45 may be fed to, for example, an inside surface of a vertically upper region of the housing portion 14. In this case, the stator 30 can be indirectly cooled through the housing 10 being cooled. Also note that one or more of the first through holes 26*a* to 26*d* may be omitted. The tooth portions 42*a* of the external gear 42 and the tooth portions 43*a* of the internal gear 43 may alternatively be arranged to have a cycloidal tooth profile or an involute tooth profile.

Also note that the drive apparatus according to the above-described embodiment may be used for any desired purpose. Also note that features described above may be combined appropriately as long as no conflict arises.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A drive apparatus comprising:
   a rotor including a motor shaft extending along a central axis that extends in one direction, and a rotor core fixed to the motor shaft;
   a stator radially opposite to the rotor with a gap therebetween;
   a housing including a housing portion to house the rotor and the stator and to store oil therein; and
   a pump portion driven by the motor shaft; wherein
   the pump portion includes:
      an external gear fixed to an end portion on a first axial side of the motor shaft;
      an internal gear surrounding the external gear on a radially outer side thereof to mesh with the external gear;
      a pump chamber to house the internal gear and the external gear;
      a suction inlet to suck the oil into the pump chamber; and
      a discharge outlet to discharge the oil from inside the pump chamber;
   the housing includes:
      an outer cover to cover the first axial side of the motor shaft and including the pump chamber defined therein; and
      a first oil passage defined in the outer cover and connected to the discharge outlet;
   the motor shaft includes:
      a second oil passage defined in an interior of the motor shaft and connected to the first oil passage; and
      a first through hole to connect the second oil passage to an outer circumferential surface of the motor shaft;
   the first oil passage is located on a first axial side of the pump chamber;
   the second oil passage opens into the first oil passage at the end portion of the first axial side of the motor shaft;
   the outer cover includes:
      an outer cover body extending radially; and
      a stopper body fixed to the outer cover body; and
   the first oil passage is defined in the stopper body.

2. The drive apparatus according to claim 1, wherein the motor shaft includes:
   a motor shaft body to which the rotor core is fixed; and
   an attachment member fixed to the first axial side of the motor shaft body and to which the external gear is fixed;
   the motor shaft body includes a hole of the motor shaft body extending to a second axial side of the motor shaft body from an end portion of the first axial side of the motor shaft body;
   the attachment member is fitted into the hole of the motor shaft body and fixed, the attachment member is tubular and opens to the first axial side and the second axial side of the motor shaft body; and
   the second oil passage is defined by an interior of the attachment member and the hole of the motor shaft bode being connected to each other in an axial direction, and is connected to the first oil passage through the interior of the attachment member.

3. The drive apparatus according to claim 2, wherein
   the outer cover body includes:
   a first recessed portion recessed to a second axial side of the outer cover body from a surface of the outer cover body on a first axial side of the outer cover body; and
   a second through hole extending through from a bottom surface of the first recessed portion into an interior of the housing to have the attachment member extend therethrough;
   the stopper body closes an opening of the first recessed portion on a first axial side of the first recessed portion; and
   the pump chamber is axially between a surface of the stopper body on a second axial side of the stopper body and the bottom surface of the first recessed portion.

4. The drive apparatus according to claim 3, wherein the attachment member includes:

a fitting portion fitted into the hole of the motor shaft body; and a fixing portion on a first axial side of the fitting portion;

the fixing portion has an outside diameter greater than an outside diameter of the fitting portion; and the external gear is fixed to a radially outer surface of the fixing portion.

5. The drive apparatus according to claim 4, wherein at least a portion of the fitting portion is inserted in the second through hole.

6. The drive apparatus according to claim 3, further comprising a rotation sensor to sense rotation of the rotor, the rotation sensor including:

an annular sensed portion fitted and fixed to the motor shaft; and a sensor portion to sense rotation of the sensed portion; and the sensed portion radially overlaps with the attachment member.

7. The drive apparatus according to claim 3, wherein the housing includes:

an inner cover to hold a bearing rotatably supporting the motor shaft and to cover a first axial side of the stator; and a third oil passage to connect the suction inlet and a vertically lower region of the housing portion;

the outer cover is attached to a first axial side of the inner cover; and at least a portion of the third oil passage is axially between the inner cover and the outer cover.

8. The drive apparatus according to claim 7, further comprising a rotation sensor to sense rotation of the rotor, the rotation sensor including:

an annular sensed portion fitted and fixed to the motor shaft; and a sensor portion to sense rotation of the sensed portion;

the inner cover includes a second recessed portion recessed to a second axial side of the inner cover from a surface on the first axial side of the inner cover;

the sensor portion is defined in the second recessed portion; and the sensed portion radially overlaps with the attachment member.

9. The drive apparatus according to claim 1, wherein the pump portion includes a storage connected to the pump chamber on a first axial side of a vertically lower region of the pump chamber; and the suction inlet is higher than a vertically lower end portion of the storage in a vertical direction and higher than a vertically lower end portion of the external gear in the vertical direction.

* * * * *